(12) United States Patent
Mohajer et al.

(10) Patent No.: US 8,805,686 B2
(45) Date of Patent: Aug. 12, 2014

(54) MELODIS CRYSTAL DECODER METHOD AND DEVICE FOR SEARCHING AN UTTERANCE BY ACCESSING A DICTIONARY DIVIDED AMONG MULTIPLE PARALLEL PROCESSORS

(75) Inventors: Keyvan Mohajer, San Jose, CA (US); Seyed Majid Emami, San Mateo, CA (US); Jon Grossman, Cupertino, CA (US); Joe Kyaw Soe Aung, Sunnyvale, CA (US); Sina Sohangir, Menlo Park, CA (US)

(73) Assignee: Soundbound, Inc., Santa Clara, CA (US)

( * ) Notice: Subject to any disclaimer, the term of this patent is extended or adjusted under 35 U.S.C. 154(b) by 943 days.

(21) Appl. No.: 12/610,920

(22) Filed: Nov. 2, 2009

(65) Prior Publication Data
US 2010/0121643 A1    May 13, 2010

Related U.S. Application Data

(60) Provisional application No. 61/110,547, filed on Oct. 31, 2008, provisional application No. 61/117,065, filed on Nov. 21, 2008.

(51) Int. Cl.
*G10L 15/04* (2013.01)
*G10L 15/00* (2013.01)
*G10L 15/05* (2013.01)
*G10L 15/14* (2006.01)
*G10L 15/32* (2013.01)

(52) U.S. Cl.
CPC .............. *G10L 15/142* (2013.01); *G10L 15/05* (2013.01); *G10L 15/32* (2013.01)
USPC ........................... 704/254; 704/251; 704/235

(58) Field of Classification Search
CPC ...... G10L 15/187; G10L 15/22; G10L 15/265
USPC .................................................. 704/273, 251
See application file for complete search history.

(56) References Cited

U.S. PATENT DOCUMENTS 6,526,380 B1 * 2/2003 Thelen et al. ................. 704/251
6,785,650 B2 * 8/2004 Basson et al. ................ 704/235
(Continued)

FOREIGN PATENT DOCUMENTS

JP          2004-102146 A     4/2004
KR    10-2003-0062369 A     7/2003

OTHER PUBLICATIONS

Wei Zhou and Wang Zengfu, "Speech Animation Based on Chinese Mandarin Triphone Model", 6th IEEE/ACIS International Conference on Computer and Information Science (ICIS 2007) 0-7695-2841-4/07.

(Continued)

*Primary Examiner* — Farzad Kazeminezhad
(74) *Attorney, Agent, or Firm* — Haynes Beffel & Wolfeld LLP; Ernest J. Beffel, Jr.

(57) ABSTRACT

The technology disclosed relates to a system and method for fast, accurate and parallelizable speech search, called Crystal Decoder. It is particularly useful for search applications, as opposed to dictation. It can achieve both speed and accuracy, without sacrificing one for the other. It can search different variations of records in a reference database without a significant increase in elapsed processing time. This is accomplished by first accessing the database, and for each word representation in the database, searching an utterance for likely instances of the word representation utilizing multiple parallel processors. Even the main decoding part can be parallelized as the number of words increase to maintain a fast response time.

33 Claims, 3 Drawing Sheets

(56) References Cited

U.S. PATENT DOCUMENTS

| | | | |
|---|---|---|---|
| 6,980,954 | B1 | 12/2005 | Zhao et al. |
| 7,085,716 | B1 | 8/2006 | Even et al. |
| 7,209,882 | B1 | 4/2007 | Cosatto et al. |
| 7,289,958 | B2 | 10/2007 | Bernard et al. |
| 7,369,992 | B1 | 5/2008 | Cosatto et al. |
| 7,739,354 | B2 * | 6/2010 | Gvily .............................. 709/218 |
| 2001/0049600 | A1 | 12/2001 | Abrego et al. |
| 2002/0072896 | A1 | 6/2002 | Roberge et al. |
| 2003/0078781 | A1 | 4/2003 | Julia et al. |
| 2003/0236663 | A1 | 12/2003 | Dimitrova et al. |
| 2005/0114133 | A1 | 5/2005 | Mark et al. |
| 2005/0203738 | A1 | 9/2005 | Hwang |

OTHER PUBLICATIONS

Guoyun Lv et al., "Single Stream DBN Model Based Triphone for continuous speech recognition", DOI 10.1109/ISM. Workshops. 2007.48, 0-7695-3084-2/07, IEEE 2007.

Supphanat Kanokphara et al., "Accessing Language Specific Linguistic Information for Triphone Model Generation: Feature Tables in a Speech Recognition System", Submitted to 2nd Language & Technology Conference: Human Language Technologies as a Challenge for Computer Science and Linguistics. (2005).

Brigitte van Berkel et al., "Triphone Analysis: A Combined Method For The Correction Of Orthographical And Typographical Errors.", Association for Computational Linguistics, Proceedings of the second conference on Applied natural language processing, Feb. 1988, pp. 77-83.

Lawrence R. Rabiner, "A Tutorial on Hidden Markov Models and Selected Applications in Speech Recognition", Proceedings Of The Ieee, vol. 77, No. 2, Feb. 1989, pp. 257-286.

Pratyush Banerjee et al., "Application of Triphone Clustering in Acoustic Modeling for Continuous Speech Recognition in Bengali", 19th International Conference on Pattern Recognition, 2008. ICPR 2008, Dec. 8-11, 2008.

Takesi Okadome, et al., "Articulatory Movement Formation By Kinematic Triphone Model", IEEE International Conference on Systems, Man, and Cybernetics, 1999. IEEE SMC '99 Conference Proceedings. 1999, vol. 2, pp. 469-474.

Fu Jie Huang, et al., "Triphone Based Unit Selection For Concatenative Visual Speech Synthesis", International Conference on Acoustics, Speech, and Signal Processing, 2002. Proceedings. (ICASSP '02). IEEE, vol. 2, pp. 2037-2040.

Ilija Zeljkovi et al., "Improved Hmm Phone and Triphone Models for Realtime Asr Telephony Applications", Fourth International Conference on Spoken Language, 1996. ICSLP 96. Proceedings, Oct. 3-6, 1996, vol. 2, pp. 1105-1108 vol. 2, pp. 1105-1108.

Christian-M. Westendorf, Jens Jelitto "Learning Pronunciation Dictionary from Speech Data", Fourth International Conference on Spoken Language, 1996. ICSLP 96. Proceedings. Oct. 3-6, 1996, vol. 2, pp. 1045-1048.

Mosur K. Ravishankar, "Sphinx-3 s3.X Decoder (X=6)", Sphinx Speech Group, School of Computer Science Carnegie Mellon University, accessed at http://cmusphinx.sourceforge.net/sphinx3/doc/s3_description.html [Oct. 28, 2009 5:06:18 PM].

Mosur K. Ravishankar, "Efficient Algorithms for Speech Recognition", Doctoral Thesis, 1996, School of Computer Science, Computer Science Division, Carnegie Mellon University, Pittsburgh, PA 15213 accessed at http://www.cs.cmu.edu/~rkm/th/th.pdf.

Eric Rouchka, Advanced Dynamic Programming Tutorial, Accessed at http://www.avatar.se/molbioinfo2001/dynprog/adv_dynamic.html>.

Eric Rouchka, Dynamic Programming, Accessed at <http://www.avatar.se/molbioinfo2001/dynprog/dynamic.html>.

"The CMU Pronouncing Dictionary", Accessed at <http://www.speech.cs.cmu.edu/cgi-bin/cmudict>.

Qi, Y., Hunt, B. R., "Voiced-unvoiced-silence classifications of speech using hybrid features and a network classifier", IEEE Transactions on Speech and Audio Processing, vol. 1, Issue 2, Apr. 1993, pp. 250-255.

International Search Report issued in corresponding PCT Application No. PCT/US2008/082256 on Apr. 28, 2009.

International Search Report and Written Opinion of the International Searching Authority, Appl. No. PCT/US09/063000, mailed Jun. 4, 2010.

* cited by examiner

MELODIS CRYSTAL DECODER METHOD AND DEVICE FOR SEARCHING AN UTTERANCE BY ACCESSING A DICTIONARY DIVIDED AMONG MULTIPLE PARALLEL PROCESSORS

RELATED APPLICATION

This application claims the benefit of U.S. Patent Provisional Application No. 61/117,065 filed on Nov. 21, 2008 and of U.S. Patent Provisional Application No. 61/110,547 filed on Oct. 31, 2008. These provisional applications are incorporated by reference.

This application is related to and incorporates by reference the following applications, which disclose technologies useful to processing speech:

"Pitch Dependent Speech Recognition Engine", U.S. patent application Ser. No. 11/971,070 filed Jan. 8, 2008, which claims the benefit of 60/884,196 filed Jan. 9, 2007;

"Pitch Selection, Voicing Detection And Vibrato Detection Modules In A System For Automatic Transcription Of Sung Or Hummed Melodies", PCT No. PCT/US08/82256 filed Nov. 3, 2008, filed in English and designating the United States, which claims the benefit of 60/985,181 filed Nov. 2, 2007;

"Pitch Selection Modules In A System For Automatic Transcription Of Sung Or Hummed Melodies", U.S. patent application Ser. No. 12/263,812 filed Nov. 3, 2008, which claims the benefit of 60/985,181 filed Nov. 2, 2007;

"Voicing Detection Modules In A System For Automatic Transcription Of Sung Or Hummed Melodies", U.S. patent application Ser. No. 12/263,827 filed Nov. 3, 2008, which claims the benefit of 60/985,181 filed Nov. 2, 2007; and "Vibrato Detection Modules In A System For Automatic Transcription Of Sung Or Hummed Melodies", U.S. patent application Ser. No. 12/263,843 filed Nov. 3, 2008, which claims the benefit of 60/985,181 filed Nov. 2, 2007.

BACKGROUND OF THE INVENTION

The technology disclosed relates to a system and method for fast, accurate and parallelizable speech search, a so-called "Crystal Decoder". It is particularly useful for search applications, as opposed to dictation. It can achieve both speed and accuracy, without sacrificing one for the other. It can search different variations of records in a reference database without a significant increase in elapsed processing time. Even the main decoding part can be parallelized as the number of words increase to maintain a fast response time.

Speech interfaces have been an area of research for many years. A number of speech recognition engines have been created that work well. However, these systems have been optimized for dictation or automatic transcription. Their main task is to convert a speech waveform to a text transcription. Knowledge of context and use of statistical language models usually help with the accuracy.

There have been many attempts to apply transcription engines to the area of speech search. In such efforts, speech is first converted to text, and then text is sent to the search engine to retrieve the results. This system suffers from a number of weaknesses, mainly because search and dictation have their own unique challenges and a system that is designed for dictation is not necessarily optimized for search. For example, not knowing the context of the search engine can reduce the accuracy of the transcription stage. Then the error in the transcription will reduce the accuracy of the search engine. Another major problem is that search engines usually have a large number of words, which makes the decoder slow and inaccurate. In order to maintain high speed, the decoder then performs pruning which introduces additional error.

An opportunity arises to deliver components of a catalog search engine that responds to utterance of search requests. These components can be used separately or in combination. Better, readily parallelized and versatile voice analysis systems may result.

SUMMARY OF THE INVENTION

We disclose a system and method for fast, accurate and parallelizable speech search, called "Crystal Decoder". It is particularly useful for search applications, as opposed to dictation. It can achieve both speed and accuracy, without sacrificing one for the other. It can search different variations of records in the reference database without a significant increase in elapsed processing time. Even the main decoding part can be parallelized as the number of words increase to maintain a fast response time. Particular aspects of the disclosed technology are described in the claims, specification and drawings.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

Introduction

Melodis' so-called Crystal Decoder is a new approach to speech search. it is an engine optimized for search applications and not for automatic transcription and dictation. In this system, voice is not converted to text blindly. Instead, an utterance is analyzed to find a desired catalog item.

Various embodiments of Crystal Decoder may have one or more of the following characteristics and/or advantages:

It does not need to use statistical language models to combine words into phrases, reducing complexity.

It does not need to perform pruning of low scoring alternative words or phrases to maintain speed.

It is a parallelizable decoder.

It can search large catalogs of millions of items with high levels of speed and accuracy.

It can consider multiple variations of each record without significant increases in running time.

Selection of items from a catalog becomes increasingly accurate as the query gets longer. For example, users can say the entire address "123 main st san francisco calif." in one utterance to find an address on a map.

The technology disclosed is very useful for natural language search applications.

Crystal Decoder vs. Conventional Decoders

The following table summarizes characteristics and/or advantages, one or more of which are found in embodiments of the Crystal Decoder compared to other conventional systems.

| THE CRYSTAL DECODER | | |
|---|---|---|
| | Crystal Decoder | Other Conventional Decoders |
| Voice to Text Conversion | Does not need to convert voice to text first. It uses a sound based representation of the search utterance as input to the search engine, which may increase accuracy. | 1: Convert voice to text<br>2: Then use the text to search<br>If there is an error in voice to text conversion, the search results will be wrong. |
| Pruning | Does not need to perform any pruning such as beam or absolute pruning. All possibilities can be considered. Speed and accuracy can be achieved together. | When catalog size is large and the number of words increases, pruning becomes necessary to keep the response time fast. Pruning sometimes eliminates the correct result and accuracy decreases. Therefore speed and accuracy cannot be achieved together. One has to be sacrificed for the other. |
| Parallelizable | Decoding can be parallelized to multiple processors. Therefore, as the number of words or catalog entries increase, use of more processors can maintain speed. Dictionaries of 500,000 to 1,000,000 words can be accommodated using current processor configurations. | Decoding is done in series frame by frame. All possibilities have to be considered together. Therefore it is not possible to parallelize the initial decoding process. If number of words is large, decoding will be slower. Therefore applications limit the number of words to maintain speed. |
| Language Models | Does not use language models to combine words into phrases. | Requires statistical language models to perform decoding. But language models are difficult to accurately predict in different usage scenarios and introduce complexity in the system. |
| Query Length | Gets even more accurate with longer queries. To find the address, users can say the entire address at once:<br>What is the address:<br>123 Main St., San Francisco, California | They become less accurate when the query is longer. Therefore applications have to ask users to say short phrases once at a time. For example:<br>What is your state: California<br>What city: San Francisco<br>What street: Main St.<br>What number: 123 |

Crystal Maker

The crystal making algorithm can be separated into "query" and "referenced" parts. The query is an utterance, which typically consists of an item to be selected from a catalog. The reference identifies an item in a catalog, against which the utterance is processed. One stage, which is the more involved one, creates an implicit graph or so-called crystal from the query or utterance. Another stage creates a graph for each of the references to be searched in response to the query. This second part can be done offline and used for multiple queries.

| Variables used in the following Query section | |
|---|---|
| b_ | transition log probabilities from state 'i' to state 'j' are denoted by '$b_{i \to j}$' |
| d | certain log distribution |
| f | frame |
| fef_ | the first end frame of a word with a particular start frame, $fef_{w, sf_{w,i}}$ |
| i, j | state indexes |
| i_s | 'i_s' is the number of incoming states of 's' |
| l | 'l' is the pronunciation length of 'w' |
| lef_ | the last contiguous end frame of a word with a particular start frame, $lef_{w, sf_{w,i}}$. |
| m | a number of states in an 'm' state hidden Markov model (HMM) |
| n | number 'n' of frames |
| n | score vectors v_s have lengths 'n' ($v_{s,0}, v_{s,1}, \ldots, v_{s,n-1}$). |
| p | word pronunciations '$p_0 p_1 \ldots p_{l-1}$' used when creating a score table. |
| q | number of entering states, sometimes denoted by $s_0, \ldots, s_{q-1}$. |
| r | total number of states in the word by 'r', indexed starting with 0. |
| s_ | incoming every 's', and for all its incoming states '$s_1$', ..., '$s_{i\_s}$', $s_1 < s, \ldots, s_{i\_s} < s$, where 'i_s' is the number of incoming states |
| sf_{w,i} | A list of winning start frames for words in a dictionary, $sf_{w,i}$. |
| u | utterance 'u' |
| v_s | a vector of scores 'v_s' for state 's' |
| w | a word 'w' in the dictionary |
| wf_{s,f} | winning start frame '$wf_{s,f}$' which for every state 's' and every frame 'f' keeps track of the starting frame that led to the best score for that state in frame 'f'. |
| x | states emits a vector random variable 'x' according to a log distribution 'd'. |

Crystal Maker—Query

Consider a set whose elements can each be represented using a hidden Markov model (HMM) chain. We call this an HMM word set. Consider also a sequence of observations that have resulted from an HMM chain corresponding to a permutation of the elements of the set and possibly of some other set. We wish to find a set of candidate start points of each element in the sequence of observation and its corresponding probability.

For the purpose of concreteness, this set could be a dictionary of words. In this case, the goal of the crystal maker algorithm is to take an utterance and calculate a likelihood measure for the occurrence of all the dictionary words in that utterance. The algorithm also determines the most likely locations for the start of every word. The power of this algorithm lies in the fact that we do not necessarily need to have all the words that were uttered in our dictionary. With this algorithm, we can measure the likelihood that a given word in our dictionary appears in the utterance, irrespective of what other acoustic phenomenon may be present in the utterance. In addition, since words can be considered independently, this process can be distributed (parallelized) across multiple processors to reduce the latency of the system. This is different from other traditional methods that need to consider all the words together and perform decoding frame by frame to apply a language model. The traditional methods cannot be distributed easily on multiple processors.

Given an utterance 'u' containing 'n' frames and a word 'w' in the dictionary and its pronunciation 'p_0p_1 . . . p_{l−1}' we create a score table. Here, 'l' is the pronunciation length of 'w'.

In one embodiment, each triphone in the pronunciation of 'w' is modeled using an 'm' state hidden Markov model (HMM). The transition log probabilities from state 'i' to state 'j' are denoted by 'b_{i−>j}'. Each state emits a vector random variable 'x' according to a certain log distribution 'd.'. A sequence of HMM's is formed for 'w' by stringing together the HMM of every triphone inside 'w'. We illustrate the HMM sequence as a directed acyclic graph. Acyclic means that if for two states 'i' and 'j' there is a non-zero probability of going from 'i' to 'j', then the probability of going from 'j' to 'i' is exactly zero.

Figure 1:
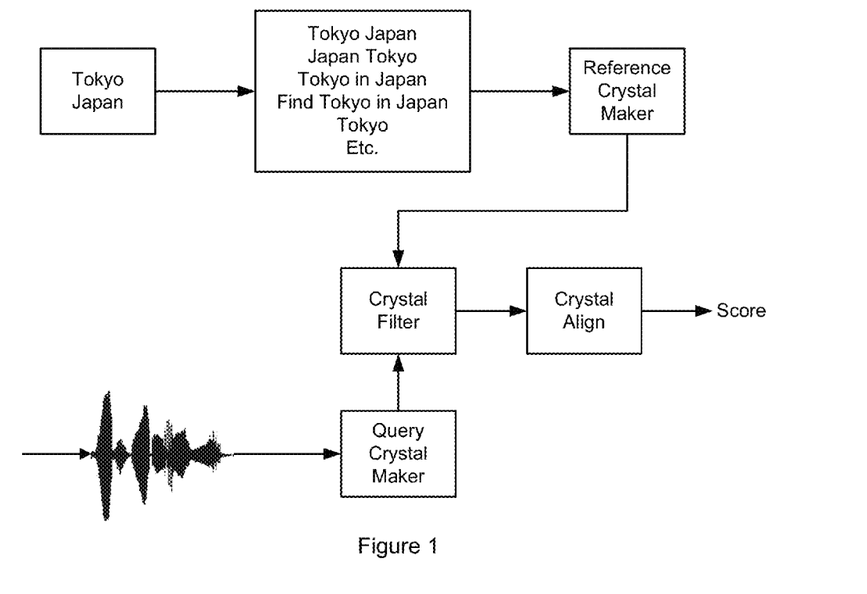
FIG. 1 illustrates a word HMM sequence. In this example, the word is composed of two triphones and each triphone is modeled by a three-state HMM.

Arrange the states of the HMM sequence in order so that for every 's', and for all its incoming states 's_1', . . . , 's_{i_s}', s_1<s, . . . , s_{i_s}<s, where 'i_s' is the number of incoming states of 's'. FIG. 1 illustrates a word HMM sequence. In this example, the word is composed of two triphones and each triphone is modeled by a three-state HMM.

For every state 's' in the HMM sequence, we allocate a vector of scores 'v_s'. This score vector has length 'n'(v_{s, 0}, v_{s,1}, . . . v_{s,n−1}). Since the HMM sequence is an acyclic graph, there are states in the sequence which have no incoming states. Denote these entering states by s_0, . . . , s_{q−1}. One of the reasons that there may be multiple entering states is that we have multiple left contexts at the beginning of the word. For instance, the word 'world' may be preceded by 'hello', in which case the first triphone of 'world' is 'OW [W] ER' (using the CMU Sphinx phonetic set). It may be preceded by 'my', in which case the first triphone of 'world' is 'AY [W] ER'. These two triphones may have different state sequences. Thus, the start states of these two triphones are in the set of entering states for 'world'. Note here that the exit states of these two triphones will become the incoming states of the start state of the second triphone in 'world'—namely 'W [ER] L'.

Denote the total number of states in the word by 'r'. Each word may have a single or multiple exit states. These are states that are not incoming to any state in the word HMM sequence. Note that here state 'r−1' is an exit state. We are interested in the score of the word 'w' in state 'r−1' (and in general in all exit states) for every frame.

Also, define a winning start frame 'wf_{s,f}' which for every state 's' and every frame 'f' keeps track of the starting frame that led to the best score for that state in frame 'f'.

If we are not interested in keeping track of a particular exit state but are only interested in the best possible score to reach any word exit and its corresponding winning start frame, we can tie the exit states together. For instance, we can append a silence phoneme at the end of 'w' and let the exit state of the silence phoneme be the same as the exit state of 'w' without silence. The exit state score in every frame will then give us the score of 'w' with or without silence, whichever is greater, in the following pseudo-code:

---
Initialization
---

```
/* Go over all the frames */
for every frame f = 0 to n − 1
    /* Go over the starting states */
    for state s = 0 to q − 1
        v_{s,f} = 0
        wf_{s, f} = f
    end
    /*
     * Preset the exit scores to keep track of whether the exit
     * state is reachable in a particular frame.
     */
    v_{r − 1,f} = −infinity
    wf_{r − 1, f} = −1
end
```

---
Table Computation
---

```
for every frame f = 1 to n − 1
    for every state s = q to r − 1
        /* t_0 is the first incoming state into s */
        v_{s,f} = v_{t_0, f − 1} + b_{t_0−>s} + d{t_0, f}
        wf_{s,f} = wf_{t_0, f − 1}
        /* i_s is the number of incoming states into s */
        for every incoming state of s, t = t_1 to t_{i_s − 1}
            score = v_{t, f − 1} + b_{t−>s} + d{t, f}
            if(score * (f − wf_{s,f}) > v_{s,f}*(f − wf_{t, f − 1}))
                v_{s,f} = score
                wf_{s,f} = wf_{t, f − 1}
            end /* if */
        end /* for every incoming */
    end /* for every state */
end /* for every frame */
```

The reader may recognize this as a modified viterbi algorithm. Every cell in the table is specified by an HMM state and a frame number. Before comparison, the score at every cell is normalized by the frame minus the winning start frame that led to that state. However, the raw score is kept throughout while computing the table. The normalization can be used to reduce dimensionality in computation. Without normalization, a new score table is required for every frame.

After this computation for every frame 'f' in 0, . . . , n−1, we will have two vectors for the exit state 'r−1':

$$v\_\{r-1, f\}$$

$$wf\_\{r-1, f\}$$

The first one indicates the best acoustic score of the word existing in frame 'f'. The other is the start frame that resulted in that end frame score in frame 'f'.

Post Processing

Here we scan through the winning start frame array for each word 'w' and produce the following information:

A list of winning start frames for every word, sf_{w,i}. Optionally, we may eliminate start frames whose normalized scores are less than a fixed threshold. The threshold can be determined using statistical modeling and may or may not depend on the properties of the word such as its length. This will reduce the set of words that will be considered later in the crystal filter.

A mapping from every start frame in the above list to the last contiguous end frame of that start frame, lef_{w, sf_{w, i}}.

A mapping from every start frame in the above list to the first end frame of that start frame, fef_{w,sf_{w,i}}

The above results implicitly form a graph or a crystal for the utterance in the query. Each node in the crystal is defined by a word 'w' and a start frame for 'w'. There are no explicit edges. As we will see in the next section, the edge scores will be computed on the fly as every reference graph is considered.

Memory and Computation Efficient Storage of Word HMM's

We run the table computation for every word in the dictionary. However, many words share the same starting letters. For instance, the words 'jump' and 'jumping' have the same starting three triphones. In a three-state HMM model depicted in FIG. 1, the two words share at least the first 9 states. We are then able to share computation if we represent the entire dictionary by a tree. The root of the tree will point to all distinct states (or phonemes or other sound-based representations of words) that start all the words in the dictionary. If two words have the same start state ID, they will share the child of the root corresponding to this state.

If two words share the same initial two states then they will share the first two levels in the tree. We keep constructing the tree in this manner so that the tree will represent all the dictionary words. A given node at a given level represents a set of all the words that share all the ancestors of this node. The leaves of the tree represent all the words that have the exact same HMM sequence.

Given the tree structure, we will apply the table computation algorithm to the nodes of the tree one level at a time. This way a sequence of states that is shared at the beginning of multiple words will only be computed once. An exemplary algorithm follows:

Loop over all the levels in the tree
    Loop over all the states in this level
        Compute the score vector for the state as in the algorithm above
    End /* Loop over all states */
End /* Loop over all levels */

The leaves of the tree now have all the information we need for performing the steps in the Post Processing section above.

Working Example

While the algorithm above is complete, it may be easier to understand in the context of a working example. Consider the word 'IT' in the dictionary. The pronunciation for IT is:
IT->IH T
Assume a silence left and right context:
SIL IH T SIL
Therefore, the triphones are:

| T1: | SIL | IH | T |
| T2: | IH | T | SIL |

Let's use a two state HMM for each triphone. We pick these triphone states from a code book that is computed a priori—i.e., each triphone maps to a fixed set of states:

| Triphone name | $1^{st}$ State Index | $2^{nd}$ State Index |
|---|---|---|
| T1 | 10 | 15 |
| T2 | 22 | 23 |

Figure 4:
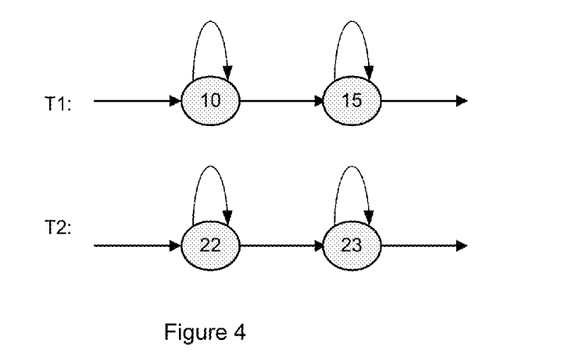
FIG. 4 depicts sample two-state HMM's for the word "IT".

The numbers above are completely arbitrary. Normally there are 6000-8000 distinct audio states that are used to build all the triphones in the English language. The two-state HMM's are depicted in FIG. 4.

We assign a (−1) to each of the transition probabilities in the HMM for the purpose of this example. However, note that in general the transition probabilities are different.

Assume there are 8 frames of audio. We have already precomputed a table of acoustic scores for each frame for each state. This portion is independent of the words in the dictionary.

Table of acoustic scores for each of the states in 'IT':

| states | 1 | 2 | 3 | 4 | 5 | 6 | 7 | 8 |
|---|---|---|---|---|---|---|---|---|
| 10 | −7 | −8 | −1 | −5 | −9 | −10 | −11 | −8 |
| 15 | −10 | −10 | −7 | −6 | −2 | −4 | −7 | −12 |
| 22 | −4 | −15 | −12 | −8 | −7 | −3 | −1 | −2 |
| 23 | −14 | −11 | −9 | −10 | −13 | −9 | −4 | −1 |

We wish the compute the score table for 'IT'. Here is the score table:

| | 1 | 2 | 3 | 4 | 5 | 6 | 7 | 8 |
|---|---|---|---|---|---|---|---|---|
| 10 | score(1, 1) = −7, 1 | −8, 2 | −1, 3 | −5, 4 | −9, 5 | −10, 6 | −11, 7 | −8, 8 |
| 15 | NR | −18, 1 | −16, 2 | −8, 3 | −11, 3 | −16, 3 | −24, 3 | −37, 3 |
| 22 | NR | NR | −31, 1 | −25, 2 | −16, 3 | −15, 3 | −17, 3 | −20, 3 |
| 23 | NR | NR | NR | −42, 1 | −39, 2 | −26, 3 | −20, 3 | −19, 3 |
| exit | NR | NR | NR | NR | −43, 1 | −40, 2 | −27, 3 | −21, 3 |

NR means non-reachable.

The first column is the sequence of the state indices introduced above. The top row is the frame number.

We initialize the top row as follows. We set the score for every column to be the acoustic score of state 10 in that frame. The start frame (the number after the comma) is set to be the frame itself.

In order to compute the score in row 2 column 2, denoted by score(2,2):

score(2,2)=score(1,1)+acoustic_score(2,2)+transition_score(10 to 15)=−7+(−10)+(−1)=−18 start_frame(2,2)=1

Similarly score(3,3)=score(2,2)+acoustic_score(3,3)+transition_score(15 to 22)=−18+(−12)+(−1)=−31

We are now ready to compute score(2,3). This is the cell for row state 15, column sample 3. There are two possible ways to get to this cell from column sample 2, row states 10 and 15. One is from cell(1,2): this represents the transition from state indexed 10 to the state indexed 15. The other is from cell(2,2): this represents the transition from state indexed 15 to itself.

Score from the parent cell(1,2) is: s1=score(1,2)+acoustic_score(2,3)+transition_score(10 to 15)=−8+(−7)+(−1)=−16

This transition assumes that the start frame is frame 2. Denote this start frame by sf1.

Score from the parent cell(2,2) is: s2=score(2,2)+acoustic_score(2,3)+transition_score(15 to 15)=−18+(−7)+(−1)=−26

This transition assumes that the start frame is 1. Denote this start frame by sf2.

Note that in the above computation the start frame is inherited from the parent cell. Now it is time to compute the winning parent cell.

score_norm(2,3)=maximum of {s1/(f−sf1+1) and s2/(f−sf2+1)}={−16/(3−2+1), −26/(3−1+1)} score_norm(2,3)=maximum of {−8, −8.67}=−8.

Thus the best score to get to cell(2,3) is −8 and the best way to get there is through cell(1,2) whose start frame is 2. Therefore:

score(2,3)=−16 start_frame(2,3)=2(inherited from cell(1,2))

Notice how the two start frames (namely 1 and 2) are competing for the best score. This is only possible because we normalized the scores by the number of frames. Similarly to compute score(2,4) first we pick the parents: cell(1,3) and cell(2,3) score_norm(2,4)=maximum of {(−1+(−6)+(−1))/(4−3+1) and (−16+(−6)+(−1))/(4−2+1)}=maximum of {−4, −7.67}=−4

Thus winning parent is cell(1,3)

score(2,4)=−8 start_frame(2,4)=3 (inherited from cell(1,3))

After we reach the final state of 'IT' and fully compute the bottom row, we go through this row and pick the distinct start frames and their score:

| end frame | start frame | score corresponding to best normalized score |
|---|---|---|
| 5 | 1 | −43 |
| 6 | 2 | −40 |
| 8 | 3 | −21 |

The scores for start frames 1 and 2 are very low and we can remove them from the list of candidates. We are thus left with start frame equal to 3. Usually for a given query of length 5 seconds we end up with an average of 5-10 start frame candidates per word in the dictionary.

In this working example, the sound-based representation uses periodic acoustic samples translated into acoustic states that are processed using at least one hidden Markov model. The hidden Markov model is used to represent the utterance and words in the dictionary. The method described is used to identify candidate word locations at arbitrary positions substantially throughout the utterance.

Other sound-based representations can be used. For instance, words can be represented directly as sequences of phonemes. The utterance can be a processed to generate a series of phonemes using any desired acoustical analysis. For instance a phoneme graph can be constructed using methods described in M. Ravishankar, Efficient Algorithms for Speech Recognition, Ph.D Thesis, Carnegie Mellon University, May 1996, Tech Report. CMU-CS-96-143. Or, one can generate the graph by the methods described in C. M. Westendorf, J. Jelitto, "Learning pronunciation dictionary from speech data", Fourth International Conference on Spoken Language, 1996. ICSLP 96 Proceedings. These two papers are hereby incorporated by reference. Applying these or other acoustical analyses, phonemes detected in the utterance will have at least one starting frame and may have a series of potential ending frames. The potential ending frames may be represented by a first and last ending frame. Phonemes can be used as the sound-based representations of the utterance and the words in the dictionary. Then the previously described word locating process would use the phonemes instead of acoustical states and hidden Markov models. As with the HMM, words represented by phonemes can be scored against potential starting locations in the utterance.

| Variables used in the following Reference section | |
|---|---|
| </s> | graph have an exit node </s> |
| <s> | graphs have a start node <s>. |
| d_ | a deletion penalty, denoted by 'd_{wid}', assigned to a graph edge that bypasses an element. The penalty may be proportional to the degree of acoustic information inherent in the word. |
| d_p | minimum penalty: The minimum penalty on the edge connecting node 'i' to node 'j', denoted by 'd_{i,j}' is: minimum of d_p over all 'p'. |
| g | graphs 'g' contain a sequence of nodes 'n' = 0, . . . , m − 1. |
| i, j | catalog item graphs are modified to allow for the deletion of words in the graph. Edges connect a node 'i' in the graph to another node 'j', bypassing the deleted node. |
| p | path over which penalty d_p is calculated |
| wid_ | visited nodes between node i and node j. |

Crystal Maker—Reference

References to catalog items are stored as graphs. The words in phrases that reference catalog items are the nodes of the graph. In one embodiment, the words are elements in an HMM word set. In other embodiments, the words may be represented by phonemes, without HMMs. Two words that follow each other are connected by an edge. To use a specific notation, each graph 'g' contains a sequence of nodes 'n'= 0, . . . , m−1. Again, as with the HMM graphs above here assume the nodes are ordered so that for every node 'n', all its incoming nodes, 'n_0', . . . , 'n_{i_n}' are less than 'n'. Each node has a word ID, 'w_n' associated with it.

Figure 3:
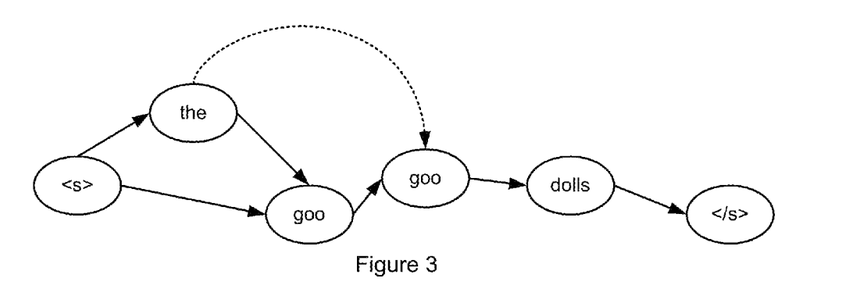
FIG. 3 shows a sample word graph.

Each graph has a start node denoted by <s>. This is an entering node and has no incoming nodes. The graph also has an exit node </s> which is not incoming to any node in the graph. All the final words in a catalog item are connected to </s>. Thus </s> has a single start frame equal to the last frame in the query. FIG. 3 shows a sample word graph.

Catalog item graphs may be modified to allow the deletion of any sequence of words in the graph. To do this, we place an edge from any node 'i' in the graph to any other node 'j' that bypasses deleted nodes. We assign a penalty to this edge as follows. First, we assign a penalty to every word in the dictionary. In one embodiment, the penalty is proportional to the degree of acoustic information inherent in the word. Denote this by 'd_{wid}'. Suppose, on a sample path from 'i' to 'j' we visit 'wid_1', 'wid_2', ..., 'wid$_n$'. Then, the penalty for this sample path indexed by 'p' is given by:

$$d\_p = d\_\{wid\_1\} + d\_\{wid\_2\} + \ldots + d\_\{wid\_n\}$$

Figure 2:
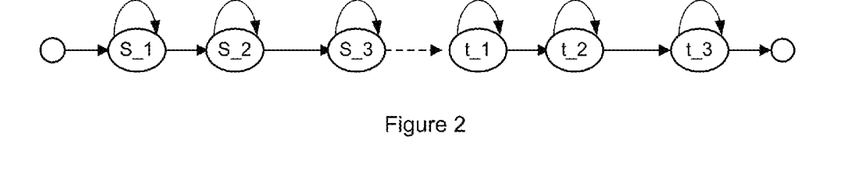
FIG. 2 illustrates a word HMM sequence. In this example, the word is composed of two triphones and each triphone is modeled by a three-state HMM.

The penalty on the edge connecting node 'i' to node 'j', denoted by 'd_{i,j}' is: minimum of d_p over all 'p'. FIG. 2 shows an example of a deletion edge with the curved dashed line. This edge would allow for the deletion of the first 'goo' in the graph. The cost associated with this edge is preset deletion cost of the word 'goo'.

For every graph, the crystal filter algorithm scores every valid path from <s> to </s>. Each such path represents a way that the user can search for this catalog item. For instance the user might say "Goo Goo Dolls" or they might say "The Goo Goo Dolls". In both these cases the user would be referring to the same band. This is why the catalog item is, in general, a graph and not a sequence of words. The crystal filter algorithm takes the output of the crystal maker in order to determine these path scores.

Alternatively, deletion penalties could be calculated based on the power of the deleted word to distinguish among catalog items, such as using relative frequency of a word among phrases in the catalog. This alternative builds upon a standard approach to text retrieval.

Reference graphs may be created as follows:

Enumerate all the possible ways that a user can say that reference. For instance, "Coffee Shop in San Francisco", "Coffee Shop in San Francisco, Calif." and "Jim's Coffee Shop in San Francisco, Calif." refer to the same item in the catalog. The first and the second alternative refer to a superset of the third alternative. Nevertheless, if a user says any of these three, "Jim's Coffee Shop in San Francisco, Calif." must be in the result set that is returned by the speech search system.

Take all these possibilities and form a minimal edge graph using existing off-the-shelf algorithms.

Optionally, add a popularity score (e.g. probability) to each path.

The optional use of these graphs to represent phrases that can be used to select an item from the catalog is accurate and comprehensive, as it enumerates all the possible ways a user can select an item. It is fast since these possibilities are stored as a graph with minimum number of edges. This avoids need for start frame pruning. Its time complexity is below order 'V', where 'V' is the total number of edges in all the reference graphs. Thus, the search complexity will grow sublinearly as the number of phrases to search grows.

Crystal Filter

In the Crystal Maker described above, we measured the utterance likelihood of every word in the dictionary and found the words' most likely positions. We now need a way to calculate the likelihood that the utterance selecting particular catalog items, so that we can sort the catalog items in terms of relevance.

The Algorithm

We begin by defining a match history table. The match history table is used to store the necessary information for the best way to arrive at a given start frame of a word. Here is what we need. Define a history table structure:

```
node_ID 'n' in the reference graph
word_ID
score: Score of the match up to the start frame of this match history row.
start_frame: Start frame of the 'word_ID' above of this match history row.
the first end frame for this word_ID for this start_frame,
first_end_frame
history table index of the previous best match, best_match_index
number of words matched so far, best_match_length
```

Before starting the matching algorithm for a particular reference, we need to initialize the match history table. Every reference graph starts with the '<s>' symbol. By definition we set the start frame of this symbol to frame 0—the very first frame. We set the score to zero and the first_end_frame to zero as well. This means that any word can now be connected to '<s>' starting in the first frame. We insert the following information as a row in the match history table:

```
node_ID of <s> = 0
word_ID = word ID of <s>, the start tag
score = 0
start frame = 0
first_end_frame = 0
best_match_index = -1
best_match_length = 0
```

Now that we have the initial condition, we can start going through the rest of the reference nodes in the graph. The following block of code essentially finds the best path to get to every start frame of every word in the reference graph in an efficient manner. The score is also computed for every such path.

For every node in the catalog item graph n=0 to m-1

```
w = w_n
/* m_w is the number of start frames of w */
/* Remember also that if w = </s> then sf = last speech frame in the utterance */
for every start frame of w, sf = sf_{w,i}, i = 1, ..., m_w
    set score = -infinity
    /* This will be the score of getting to node 'n' starting in frame 'sf' */
    for every incoming node of n, k = n_0, ..., n_{i_n}
        /* Since the first_end_frame list for every query
         * node k is sorted the following list can be quickly accessed:
         */
        for every history table row corresponding to node k, ht_k
            if(first_end_frame of ht_k < sf)
                /* Compute the score of the word leading to w_n
                 * We shall describe the acoustic_score function
                 * later below.
                 */
                query_transition_cost = acoustic_score(ht_k.word ID, ht_k.start_frame, sf)
```

```
            ref_transition_cost = d_{ht_k.node_ID, n}
            /* This is precomputed for all references as explained above */
            if(score < query_transition_cost + ref_transition_cost + ht_k.score)
                score = query_transition_cost + ref_transition_cost + ht_k.score
                best_match_index = ht_k
                best_match_length = ht_k.best_match_length + 1
            end /* if */
          else
            break out of for . . . ht_k
          end /* if(start_frame of ht_k . . . */
        end /* for . . . ht_k */
      end /* for . . . k */
      if(score > -infinity)
        create a new history table structure new_ht
        new_ht.node_ID = n
        new_ht.word_ID = w_n
        new_ht.start_frame = sf
        new_ht.first_end_frame = fef_{w_n, sf}
        new_ht.score = score
        new_ht.best_match_index = best_match_index
        new_ht.best_match_length = best_match_length
      end /* if */
    end /* for . . . sf */
end
```

Applying this algorithm, the catalog_item_score=score of the last element in the match history table.

In this algorithm, reference to the function acoustic_score (word_ID, sf, ef) means

```
    if(wf_{exit state, ef} == sf)
        return v_{exit state, ef}
    end /* if */
    /* See the definition of lef in the crystal making algorithm above */
    lef = lef_{word_ID, sf}
    delta = ef - lef
    /* Below frame_deletion_penalty is a tunable negative parameter */
    return v_{exit state, lef} + frame_deletion_penalty * delta
end
```

This score is then used to rank the items in the catalog. Note that here we have computed a rough score for every catalog item graph. Suppose the crystal maker determines that a word starts in frame 'f'. The final probability of the word ignores the viterbi history of the utterance before this frame. This, however, does give us a rough measure of the word score. Once we rank the crystal filter results we can take the top 'N' candidates and perform a more refined scoring on these candidates. 'N' here is chosen so that with high probability the desired catalog item is included in the list of top 'N' candidates. FIG. 3 illustrates a sample word graph. The dashed link means that we allow the deletion of the first 'goo'. A deletion cost is associated with following edges that delete words.

Working Example of the Crystal Filter

Figure 5:
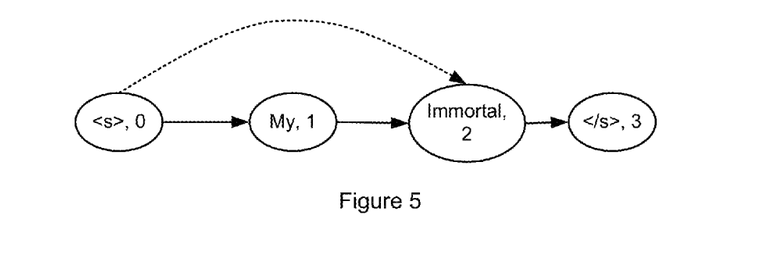
FIG. 5 depicts a reference lattice.

The so-called Crystal Filter can be applied in a simplified example. For the purpose of this example we choose the reference lattice depicted in FIG. 5. In FIG. 5, the dashed line represents the fact that the word 'My' may be deleted with a penalty of '−40'. The solid lines have zero penalties.

Assume the audio is 100 frames. Suppose also after the Crystal Maker has run, we will have the following information for the words 'My' and 'Immortal':

| Start and end frame information for the word 'My' | | |
|---|---|---|
| Start frame | First end frame | Last end frame |
| 10 | 20 | 30 |
| 25 | 41 | 50 |
| 60 | 72 | 100 |

| Start and end frame information for the word 'Immortal' | | |
|---|---|---|
| Start frame | First end frame | Last end frame |
| 5 | 40 | 65 |
| 46 | 75 | 100 |

In addition to this information, we have available the score of the words starting in a particular frame and ending in any frame. For instance, the score of 'Immortal' starting in frame 46 and ending in frame 80 is −45. We also have the score of a filler word (e.g. silence) starting in frame zero and ending in any given frame.

We create the match history table with the following fields and insert the start tag into it:

| Node_ID | Word_ID | Score | Start_frame | Match history | Match Length |
|---|---|---|---|---|---|
| 0 | <s> | 0 | 0 | −1 | 0 |

For this example, we will use the word itself as the word ID. However, computers more typically map words to integer indexes starting from zero. These integer ID's are easier to use that the words themselves.

We now go over the inner words of the reference, as illustrated in the table below. For Node_ID n=1, the word is 'My'. Its alternative Start frames are 10, 25, and 60. We now intend to find the best way to get to all the start frames of 'My'.

sf=10, sf_{'My', 1}, the first start frame of 'My'.

Initialize the score=−infinity

The only incoming to the word 'My' is '<s>'.

Go through all the rows in the match history table corresponding to '<s>'. There is only one such row. Call it mht_row. Is the first end frame of <s> before sf=10? Yes. Thus,
query_transition_cost=acoustic_score(<s>, 0, 10), which we in this example to be −25.
reference_transition_cost=score of the solid arrow going from '<s>' to 'My'.
new_score=query_transition_cost+reference_transition_cost+mht_row.score=−25+0+0
Since 'new_score'>'score' (which we initialized to −infinity) we set 'score' to 'new_score': score=−25.
best_match_index=0
where best_match_index is the index of the match history table that resulted in the best score.

We are done with all the match history rows of all the incoming nodes of 'My' (there was only one). Since score is not '−infinity', we can insert a new match history row for sf=10 of 'My':

| Node_ID | Word_ID | Score | Start_frame | Match history | Match Length |
|---|---|---|---|---|---|
| 0 | <s> | 0 | 0 | −1 | 0 |
| 1 | My | −25 | 10 | 0 | 1 |
| 1 | My | −30 | 25 | 0 | 1 |
| 1 | My | −80 | 60 | 0 | 1 |

Similarly we have filled the another two rows by assuming that '<s>' ends in frame 25 with a score of −30 and ends in frame 60 with a score of −80.

Next, for Node_ID n=2, the word is 'Immortal'. Its start frames are 5, 46. sf=5, sf_{'Immortal', 1}, the first start frame of 'Immortal'.
Again, set score to −infinity.
Go over the incoming nodes of node '2'.
The first one is '<s>', node 0.
Go over all the match history table items corresponding to '<s>'. There is only 1.
query_transition_cost=acoustic_score(<s>, start frame=0, end frame=5) (assume this is −15)
new_score=query_transition_cost+ref_transition_cost+mht_row.score=−15+(−40)+0=−55
Since 'score'<'new_score', set
score=−55
best_match_index=0
The second incoming of 'Immortal' is 'My', node 1.
Go over all the match history items corresponding to node 1. There are 3 corresponding rows. For these rows, the first end frame of 'My' (20, 41, and 72) is greater than the start frame of 'Immortal' under consideration, 5. Thus they will have a −infinity acoustic score.
Thus for 'sf'=5 of the word 'Immortal' we get the following match history table:

| Node_ID | Word_ID | Score | Start_frame | Match history | Match Length |
|---|---|---|---|---|---|
| 0 | <s> | 0 | 0 | −1 | 0 |
| 1 | My | −25 | 10 | 0 | 1 |
| 1 | My | −30 | 25 | 0 | 1 |
| 1 | My | −80 | 60 | 0 | 1 |
| 2 | Immortal | −55 | 5 | 0 | 1 | n=2, sf=46, sf_{'Immortal', 2}
The possible incomings are the three rows below the title.
The scores for:

match history index 0: new_score=acoustic_score(<s>, start frame=0, end frame=46)
(assume −70)+reference_transition_cost+mht_row[0].score=−70−40+0=110
match_history_index 1: new_score=acoustic_score(My, start frame=10, end frame=46)+reference_transition_cost+mht_row[1].score Now note from the table above for the word "My", the last end frame of 'My' corresponding to the start frame 10 is 30 which is less than 46. Here, the acoustic_score method will return the score of 'My' starting in frame 10 and ending in frame 30 (assume −80) plus (46−30)*(deletion_penalty), where deletion_penalty is a tunable parameter say −5 per frame.
Thus, 'acoustic_score(My, start frame=10, end frame=46)=−80+16*(−5)=−160
new_score=−160+0−25=−185
match history index 2: new_score=acoustic_score(My, 25, 46)+reference_transition_score+mht_row[2].score=−40+0−30=−70

Thus the best score for the start of 'Immortal' at frame 46 is −70, and the best way to get there is through row index 2. This new row is the next to bottom row in the table below.
We similarly can fill out the rest of the table:

| Node_ID | Word_ID | Score | Start_frame | Match history | Match Length |
|---|---|---|---|---|---|
| 0 | <s> | 0 | 0 | −1 | 0 |
| 1 | My | −25 | 10 | 0 | 1 |
| 1 | My | −30 | 25 | 0 | 1 |
| 1 | My | −80 | 60 | 0 | 1 |
| 2 | Immortal | −55 | 5 | 0 | 1 |
| 2 | Immortal | −70 | 46 | 2 | 2 |
| 3 | </s> | −110 | 100 | 5 | 3 |

We assumed that:
acoustic_score('Immortal', 5, 100)=−300, note here that we need to delete frame 65 through 100 for this case.
acoustic score('Immortal', 46, 100)=−40
Also, note that '</s>' is treated like a word with a single start frame equal to the number of frames in the audio.
We see that the score of matching the reference in the table above is −110. We can also back trace through the match history table using the match history column and find the best path:

<s>, start frame = 0
My, start frame = 25
Immortal, start frame = 46
</s>, start frame = 100

Crystal Align

In order to determine a more refined likelihood measure for the list of top 'N' candidates, we run a final alignment on every one of these candidates. For this part of the system we can simply use a standard HMM alignment program such as used in CMU's Sphinx implementations. We use these refined likelihood measures for the final ranking Optionally, the popularity score of the records, and/or the paths in each record, can be used to adjust the final scores.

Some Particular Embodiments

The present invention may be practiced as a method or device adapted to practice the method. The same method can be viewed from the perspective of word spotting, phrase spotting or both. The invention may be an article of manufacture such as media impressed with logic to carry out computer-assisted word spotting, phrase spotting or both.

The technology disclosed may be applied in a variety of methods and successive methods. It also may be incorporated in systems or devices. Some devices that apply the technology disclosed are computers combined with software. Others are articles of manufacture, including computer readable storage media loaded with instructions they can be combined with a processor to carry out the methods. Alternatively, a computer readable transmission media may convey instructions that can be combined with the processor to carry out the methods.

Figure 6:
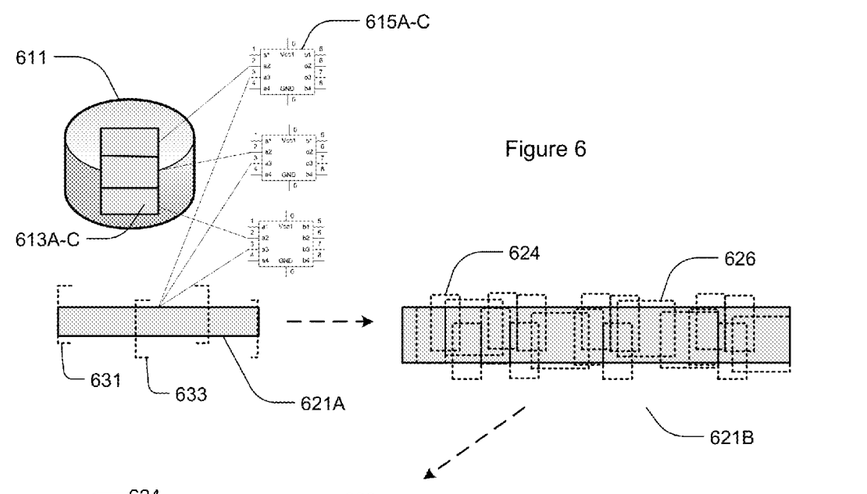
FIG. 6 depicts system hardware and steps of a word spotting method.

One method that applies the technology discloses a method of electronically processing an utterance to locate candidate words at arbitrary positions 624, 626 within the utterance 621A. FIG. 6 depicts aspects of this word spotting method. This method includes dividing a dictionary 613 of word representations into multiple word sets 613A-C. The dictionary may be stored in a rotating or non-rotating memory 611. The word sets can then be processed in parallel. The word representations optionally may be based on hidden Markov models (FIGS. 2, 4), phoneme representations, or other conventional representations of words that are used in automated sound recognition. When hidden Markov models are used, the HMMs may represent phonemes or may directly represent words, without intermediate phoneme representations.

This first method continues with searching and scoring for particular word sets. It involves searching the utterance 621A for likely instances of each word representation at locations in the utterance 624, 626 that overlap in time 621B. The utterance 621A electronically represents a passage of speech. The utterance may be divided into frames, phonemes or using another conventional representation of speech from the art of automated sound recognition. Likely instances of word representations overlap as generally depicted in FIG. 6, 621B. Each likely word instance 624, 626 is scored with a probability of a match between the word representation and a particular location in the utterance.

The searching and scoring are performed on multiple processors 615A-C, each operating on a respective one of the multiple word sets 613A-C.

This method usefully reports at least a subset of likely word instances 621B and respective probability scores for further electronic processing.

In some trials, it has been observed that the number of likely word instances reported may be five or six times the number of words in the dictionary. With tighter cut-offs for reporting, the number of likely word instances reported may be reduced to three times as many as the number of words in the dictionary. Or it may be reduced even further. The trade-off that needs to be considered is between reducing the amount of filtering during phrase spotting that follows the word spotting, and keeping the likely word instance subset large enough that the speaker's intended words are not eliminated before phrase spotting.

The further electronic processing may typically include filtering and alignment. The filtering is described as a successive method that can be combined with this first method or practiced separately. The alignment practices a conventional technique, such as described at Carnegie Mellon University's website for the Sphinx project.

One aspect of the technology disclosed includes representing a likely word instance in a data structure that includes a start frame, a first end frame, a last end frame. When the first and last end frames are different, multiple probability scores are assigned to varying lengths of segments in the utterance.

The dynamic programming methods described above can be applied to the searching and scoring. These dynamic programming methods include Viterbi and modified Viterbi methods. Note that a dynamic programming method can accomplish the searching and scoring in a single pass.

Normalizing is useful when using dynamic programming, because dynamic program scoring typically accumulates partial scores as a table of possible matches between source and target sequences is traversed. In some instances, such as slow and halting speech, matches to longer parts of the utterance may have unfavorable scores, because they accumulate to less favorable scores. One way to normalize is to divide a score calculated by the dynamic programming method by the number of frames in the matching segment of the utterance. This facilitates comparison of likely word instances that match shorter and longer passages of the utterance. A number of other normalization approaches could be substituted for using the number of frames, such as a function of the number of frames. The function might be exponential, logarithmic, linear, quadratic or a similar monotonic function. Normalizing can be applied to either HMM-based or phoneme-based representations and analysis.

A phoneme representation of an utterance can be based on phoneme graphs constrained by a language model. The language model preferably would use the word representations in the dictionary. It might also use phrases from a catalog. The language model can be used to create a phoneme graph of reduced density, by only allowing transitions that actually occur in the dictionary and/or catalog. A language model-constrained phoneme graph can then be trained against audio data. The audio data may represent alternative pronunciations by more than 100 speakers or by more than 1000 speakers. Transition probabilities for edges of the phoneme graph may be derived by training from the audio data, by language model analysis of the text in the dictionary and/or catalog, or by combining analysis from both sources.

Parallel processing can be further extended to subdividing the utterance 621A into segments overlapping in time 631, 633. The overlap should assure that a long word will not be bisected and made unrecognizable.

Figure 7:
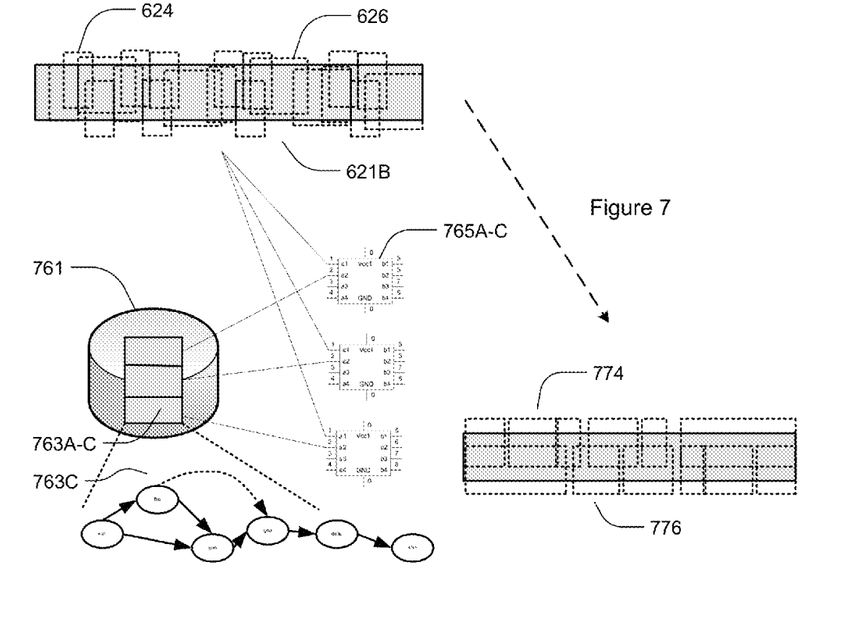
FIG. 7 depicts system hardware and steps of a phrase spotting method.

A successive method, usefully combined with the word spotting above, involves phrase spotting. FIG. 7 depicts this phrase spotting method. Phrase spotting matches the likely word instances to catalog entries. It includes dividing a catalog of phrases 763 that represent items into multiple phrase sets 763A-C. The catalog may be stored in a rotating or non-rotating memory 761. The phrase sets can then be processed in parallel by multiple processors 765A-C. The method continues with searching and scoring particular phrase sets 763A-C. It involves searching a set or reported subset of likely word instances 621B for likely occurrences of each phrase 774, 776. Each likely phrase occurrence is scored for probability of a match between the phrase 763 and the utterance 621B. The dynamic programming methods described above can be applied to the searching and scoring. The searching and scoring are performed on multiple processors 765A-C, operating on a respective one of the multiple phrase sets 763A-C.

The method usefully reports at least a subset of likely phrase occurrences 774, 776 and respective probability scores for further processing. The further processing may include sorting the likely phrase occurrences and presenting one or more of the likely phrase occurrences to a user for confirmation or selecting one or more items from a catalog based on the likely phrase occurrences. One or more selected catalog items can, in turn, be presented to the user.

In some implementations, ordered words and phrases can be organized into phrase graphs 763C. At lease some of the items in the catalog will be represented by multiple phrases with different word orderings. Phrase graphs represent all phrases for which items from the catalog will be selected. The phrase graphs may include edges (FIG. 3, dashed line) that indicate words subject to deletion with corresponding penalties for deleting words.

As described above, likely word instances may be represented by a data structure that includes fields for starting frame, starting frame, last starting frame and probability of a match. Where the first ending frame and last ending frame differ, multiple probabilities may be recorded in the data structure.

The processing of successive likely word instances may include splitting a sound between successive word instances. This may happen when a particular sound occurs at the end of one word and the beginning of the next word. Overlapping between likely word instances can be avoided by splitting a sound between two word instances, eliminating overlap. The difference between a first end frame and a last end frame can be used to handle the splitting.

Some phrases in the dictionary can be eliminated from consideration because they start with one or more words that are not found in a subset of likely word instances.

The phrase spotting method described immediately above need not be practiced successively with the word spotting method described. It is useful with a wide variety for spotting methods. Instead of depending on the earlier method, it made be described independently, beginning with step of searching for and scoring a set of likely word instances in an utterance 624, 626, with overlap among likely word instances 621B. Then, the steps from dividing the catalog of phrases 763A-C onward can proceed, without depending on any particular word spotting method.

A variety of computer devices and systems can practice the methods described above. One device is a system that electronically processes an utterance to locate candidate words at arbitrary positions within the utterance. It includes first multiple processors 615A-C and memory coupled to the processors. It further includes a dictionary of word representations 613 stored in first memory 611, the dictionary divided into multiple sets 613A-C.

A word searching-scoring module 617A processes a particular word set 613A. This includes searching and scoring. It searches the utterance 621A stored in a second memory for likely instances of each word representation at locations 624, 625 in the utterance that overlap in time 621B and scores each likely word instance for probability of a match between the word representation and a particular location in the utterance.

A first coordination module 619 is adapted to assign multiple instances of the word searching-scoring modules 617A-C to run on the first multiple processors 615A-C, each word searching-scoring module 617A-C assigned to search and score using respective one of the multiple word sets 613A-C.

The first reporting module (not shown) is coupled in communication with the first coordination module 619 and/or the word searching-scoring modules 617A-C. It reports at least a subset of likely word instances 621B and respective probability scores for further electronic processing. As described above, the further electronic processing may be accomplished by a successive phrase-spotting component (FIG. 7) coupled to the word spotter (FIG. 6).

The phrase spotter is a computer system that may accept input from the word spotting system described above (FIG. 6) or from any other word spotting system. This phrase spotting system may process the likely word instances 621B reported by the word spotter against catalog entries 761. It includes second multiple processors 765A-C coupled to the memory. The second multiple processors 765A-C may be coincident with, overlap with or be distinct from the first multiple processors 617A-C of the word spotter.

The phrase spotter includes a catalog of phrases 763 that represent items, the catalog divided into multiple phrase sets 763A-C. The catalog is stored in a third memory 761. It further includes of phrase searching-scoring module 767A that processes a particular phrase set 763A. This module is adapted to search and score. It searches the reported subset of likely word instances 621B for likely occurrences of each phrase and scores each likely phrase occurrence 774, 776 for probability the match between the phrase and the utterance 621A.

A second coordination module 769 is adapted to assign multiple instances of the phrase searching-scoring modules 767A-C to run on the second multiple processors 765A-C. Each phrase searching-scoring module 767A-C is assigned to search and score a respective one of the multiple phrase sets 763A-C.

A second reporting module (not illustrated) is coupled in communication with the second coordination module 769 and/or the phrase searching-scoring modules 767A-C. It reports at least a subset of likely phrase occurrences 774, 776 and respective probability scores for further processing. The further processing maybe as described in the methods above.

Without repeating the features, aspects and options of the methods described above, one of skill in the art will understand that the two systems described above may optionally include any of the features of the methods described earlier. The features, aspects and options of the methods should be treated as if they were multiply dependent claims modifying an omnibus system embodiment of the first method and of the second method, the second method both practiced by itself and in combination with the first method.

An article of manufacture may include a computer readable storage media that includes computer instructions. The computer instructions either may implement one of the methods above, or they may be designed to create one of the devices described when the computer instructions are installed on a system with multiple processors and memory. All of the features of the methods and devices may optionally be included among computer instructions on these articles of manufacture.

The technology disclosed addresses the problem with electronically processing an utterance to locate candidate words at arbitrary positions within the utterance, as illustrated in FIG. 6. An alternative way of viewing the technology disclosed includes the following method:

Dividing a dictionary 613 of representations of words into parts 613A-C and processing the parts in parallel on multiple processors 615A-C. The dictionary may be stored in a rotating or non-rotating memory 611.

Comparing and scoring the representations of the words to the utterance 621A at locations substantially throughout the utterance, using the processors 615A-C, wherein the scoring treats words independently at least during a first pass and treats scoring of a word at non-overlapping locations independently scoring that word at other locations. This produces candidate words scored for a probability that the candidate words appear at the locations in the utterance.

Reporting at least a subset of candidate words at locations (624, 626 in 621B) based on the parallel processed, independently scored word-location comparisons.

In some implementations, the sound-based representations include phonemes. These phonemes, in turn, can be represented by hidden Markov models (FIGS. 2, 4). The hidden Markov models may include three or more states per phoneme. Phonemes may be combined into triphones that improve the accuracy of representing words as successive phonemes. Representation of the phonemes as hidden Markov models is entirely optional, as there are a wide variety of technologies for extracting phonemes from a series of audio samples.

The sound-based representations of the words may be hidden Markov models, without intermediate phoneme representations.

The parallel processing may be further subdivided and allocated to separate processors by dividing the utterance into two or more overlapping parts 631, 633 and assigning the parts for parallel processing on multiple processors 615A-C.

The dictionary includes thousands of words. Typically, it has more than 10,000 words and often in the range of 60,000 to 100,000 words. With current processors, the dictionary preferably is less than 500,000 words. With future processors or implementations on GPU's, dictionaries of 1 million words and more will be practical. To accommodate multiple speakers, dictionaries may have multiple phonetic representations of the same word or multiple dictionaries that match different patterns of pronunciation.

A partial solution to the problem of using spoken utterances to select items from a catalog is illustrated in FIG. 7. It includes:

Finding candidate words 624, 626 at arbitrary locations throughout an utterance 621B, with overlap among the candidate words. This may be done using the method illustrated in FIG. 6 or any other word spotting method chosen.

Using a catalog 763A-C that identifies items by ordered word phrases 763C, the phrases including multiple words and alternate word orderings that identify the items. The catalog may be stored in a rotating or non-rotating memory 761.

Dividing the catalog into parts 763A-C and processing the parts in parallel on multiple processors 765A-C, Comparing and scoring the phrases in the catalog (e.g., 763C) to the candidate words (e.g., 624) in the utterance 621B using the multiple processors 765A-C, wherein the scoring eliminates from consideration any phrases that are anchored by word(s) not found in the utterance and scoring remaining phrases beginning at locations (e.g., 624) in the utterance where the anchoring candidate words are located. Those with skill in the art will understand that the anchor can be at the beginning or end of a phrase with little computational difference. Likely phrase occurrences are scored for a probability that the phrase matches the utterance.

A set of likely phrase occurrences is reported for further processing.

This method may further include applying dynamic programming to score ordered, non-overlapping sequences of the candidate words 774, 776 against the phrases. It may include any of the phrase spotting features, aspects or options described above.

A device embodiment, from the word spotting or phrase spotting perspective, may be embodied in a device including multiple processors, memory coupled to the processors, one or more ports coupled to the processor (or the memory) adapted to word spotting and/or phrase spotting. Features, aspects and options of the devices described above can be combined with this alternative device embodiment, as if they were multiply dependent claims related to an omnibus system claim.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for word and/or phrase spotting, systems including logic and resources to carry out word and/or phrase spotting, systems that take advantage of computer-implemented word and/or phrase spotting, media impressed with logic to carry out word and/or phrase spotting, data streams impressed with logic to carry out word and/or phrase spotting, or computer-accessible services that carry out computer-assisted word and/or phrase spotting. It is contemplated that modifications and combinations will readily occur to those skilled in the art, which modifications and combinations will be within the spirit of the invention and the scope of the following claims.

We claim as follows:

1. A method of electronically processing an utterance to locate candidate words at arbitrary positions within the utterance, including:

accessing a dictionary of word sets each comprising multiple word representations;

for each word representation, searching the utterance for likely instances of the word representation and scoring each likely word instance for a probability of a match to the word representation;

wherein, the utterance is searched by multiple processors operating on the multiple word sets; and reporting at least a subset of likely word instances and respective probability scores for further electronic processing.

2. The method of claim 1, further including applying dynamic programming to phoneme representations of the utterance and the word representation during the searching and/or scoring.

3. The method of claim 2, further including analyzing the utterance against one or more phoneme graphs that represent allowable transitions between successive phonemes, wherein the allowable transitions are constrained by a language model based on the word representations in the dictionary.

4. The method of claim 3, further including training the phoneme graphs against audio data.

5. The method of claim 4, wherein the trained phoneme graphs represent alternative pronunciations by more than 100 speakers.

6. The method of claim 2, further including constructing the phoneme representations for the word representations as one or more phoneme graphs.

7. The method of claim 6, wherein the scoring uses probabilities derived from training the phoneme graphs against audio data and not probabilities derived from a language model.

8. The method of claim 2, wherein the scoring further includes normalizing partial scores accumulated while applying the dynamic programming, whereby the scores for the likely word instances can be meaningfully compared between the likely word instances that match shorter and longer parts of the utterance.

9. The method of claim 1, applied to matching the likely word instances to catalog entries, the method further including:

accessing a catalog of phrases sets each comprising multiple phrase representations;

for each phrase representation, searching the reported subset of likely word instances for likely occurrences of each phrase and scoring each likely phrase occurrence for a probability of a match between the phrase and the utterance;

wherein the subset of likely word instances is searched by multiple processors operating on the multiple phrase sets; and reporting at least a subset of likely phrase occurrences and respective probability scores for further processing.

10. The method of claim 9, wherein the phrases include ordered words organized into one or more phrase graphs.

11. The method of claim 10, wherein at least some of the items in the catalog are represented by multiple phrases with different word orderings.

12. The method of claim 11, wherein the phrase graphs represent all phrases for which items from the catalog will be selected.

13. The method of claim 11, wherein the phrase graphs include edges that indicate deleted words and penalties associated with deleting words from phrases.

14. The method of claim 9, further including applying dynamic programming to scoring the phrases against ordered, non-overlapping sequences of the likely word instances.

15. The method of claim 14, further including splitting a sound in the utterance shared by successive likely word instances, thereby eliminating overlap.

16. The method of claim 14, further including eliminating from consideration phrases that start with one or more words not found in the subset of likely word instances.

17. The method of claim 16, further including splitting a sound in the utterance shared by successive likely word instances, thereby eliminating overlap.

18. The method of claim 9, wherein each likely word instance is represented by at least a start frame, a first end frame, a last end frame and multiple probability scores when the first end frame and the last end frame are different, further including using overlap between likely word instances when searching for the phrase to eliminate from consideration some of the likely word instances.

19. The method of claim 1, further including applying dynamic programming to hidden Markov models of the utterance and of the word representation during the searching and/or scoring.

20. The method of claim 19, wherein the hidden Markov models represent phonemes.

21. The method of claim 19, wherein the hidden Markov models for the word representations model words without intermediate phoneme representations.

22. The method of claim 9, wherein the scoring further includes normalizing partial scores accumulated while applying the dynamic programming, whereby the scores for the likely word instances can be meaningfully compared between the likely word instances that match shorter and longer parts of the utterance.

23. The method of claim 1, wherein each likely word instance is represented by at least a start frame, a first end frame, a last end frame and multiple probability scores when the first end frame and the last end frame are different.

24. The method of claim 1, further including reporting for further processing at least three times as many likely word instances as there are distinct words in the dictionary.

25. A method of matching candidate words in an utterance to catalog entries, the method including:
   searching the utterance for likely instances of word representations and scoring each likely word instance for a probability of a match to the word representations;
   accessing a catalog of phrases sets each comprising multiple phrase representations;
   for each phrase representation, searching a set of likely word instances for likely phrase occurrences and scoring each likely phrase occurrence for a probability of a match between the phrase and the utterance;
   wherein the set of likely word instances is searched by multiple processors operating on the multiple phrase sets; and
   reporting at least a subset of likely phrase occurrences and respective probability scores for further processing.

26. A device that of electronically processes an utterance to locate candidate words at arbitrary positions within the utterance, including:
   first multiple processors;
   memory coupled to the processors;
   a dictionary of word representations stored a first memory, the dictionary of word sets each comprising multiple word respresentations;
   a word searching-scoring module that processes a particular word set, the word searching-scoring module adapted to, for each word representations
      search the utterance stored in a second memory for likely instances of the word representation and
      score each likely word instance for a probability of a match to the word representation;
   further including a first coordination module adapted to assign multiple instances of the word searching-scoring modules to run on the first multiple processors; and
   a first reporting module coupled in communication with the first coordination module and/or the word searching-scoring modules that reports at least a subset of likely word instances and respective probability scores for further electronic processing.

27. The device of claim 26, extended to process the likely word instances against catalog entries, including:
   second multiple processors coupled to the memory;
   a catalog of phrases that represent items, stored a third memory, the catalog divided into multiple phrase sets each comprising multiple phase representations;
   a phrase searching-scoring module that, for each phrase resprentation
      searches the reported subset of likely word instances for likely phrase occurrences and
      scores each likely phrase occurrence for a probability of a match between the phrase and the utterance;
   further including a second coordination module adapted to assign multiple instances of the phrase searching-scoring module to run on the second multiple processors; and
   a second reporting module coupled in communication with the second coordination module and/or the phrase searching-scoring modules that reports at least a subset of likely phrase occurrences and respective probability scores for further processing.

28. An article of manufacture including a computer readable non-transitory storage media containing at least instructions to carry out a method of electronically processing an utterance to locate candidate words at arbitrary positions within the utterance, including:
   accessing a dictionary of word sets each comprising multiple word representations;
   for each word representation, searching the utterance for likely instances of the word representation and scoring each likely word instance for a probability of a match to the word representation;
   wherein, the utterance is searched by multiple processors operating on the multiple word sets; and
   reporting at least a subset of likely word instances and respective probability scores for further electronic processing.

29. An article of manufacture including a computer readable non-transitory storage media containing at least instructions to carry out a method of matching candidate words in an utterance to catalog entries, the method including:
- searching the utterance for likely instances of word representations and scoring each likely word instance for a probability of a match to the word representations;
- accessing a catalog of phrases sets each comprising multiple phrase representations;
- for each phrase representation, searching a set of likely word instances for likely occurrences of each phrase and scoring each likely phrase occurrence for a probability of a match between the phrase and the utterance;
- wherein the set of likely word instances is searched by multiple processors operating on the multiple phrase sets; and
- reporting at least a subset of likely phrase occurrences and respective probability scores for further processing.

30. A method of matching candidate words in an utterance to items in catalog entries, the method including:
- accessing a phrase dictionary representing catalog entries for the items, wherein all of the phrases used to select the items are represented in the phrase dictionary;
- receiving candidate phoneme sequences tentatively recognized from the utterance, with confidence scores;
- traversing parts of the phrase dictionary, in parallel using multiple processors, locating candidate phrases that match sequences within the utterance of non-overlapping candidate phonemes;
- calculating phrase confidence scores for the candidate phrases; and
- reporting at least a subset of the candidate phrase and respective candidate phrase scores for further processing.

31. The method of claim 30, further including using the candidate phrase confidence scores to select one or more items based on their catalog entries.

32. The method of claim 30, wherein the phrase dictionary is represented by phase graphs with optional edges that indicate words subject to deletion.

33. The method of claim 30, wherein the candidate words are constrained by words and phrases in the catalog entries.

* * * * *

UNITED STATES PATENT AND TRADEMARK OFFICE
CERTIFICATE OF CORRECTION

PATENT NO. : 8,805,686 B2  
APPLICATION NO. : 12/610920  
DATED : August 12, 2014  
INVENTOR(S) : Mohajer et al.

Page 1 of 1

It is certified that error appears in the above-identified patent and that said Letters Patent is hereby corrected as shown below:

On the title page, after item "(73) Assignee:", delete "Soundbound, Inc." and insert -- SoundHound, Inc. --.

In the Claims

In claim 22, column 23, line 44, after the word "claim", delete "9" and insert -- 19 --.

In claim 26, column 24, line 13, delete "respresentations;" and insert -- representations; --.

In claim 27, column 24, line 36, delete "resprentation" and insert -- representation --.

Signed and Sealed this  
Twenty-first Day of July, 2015

Michelle K. Lee  
*Director of the United States Patent and Trademark Office*